Aug. 31, 1937.  A. PETELER  2,091,830
SHOCK ABSORBER VALVE
Filed June 9, 1936
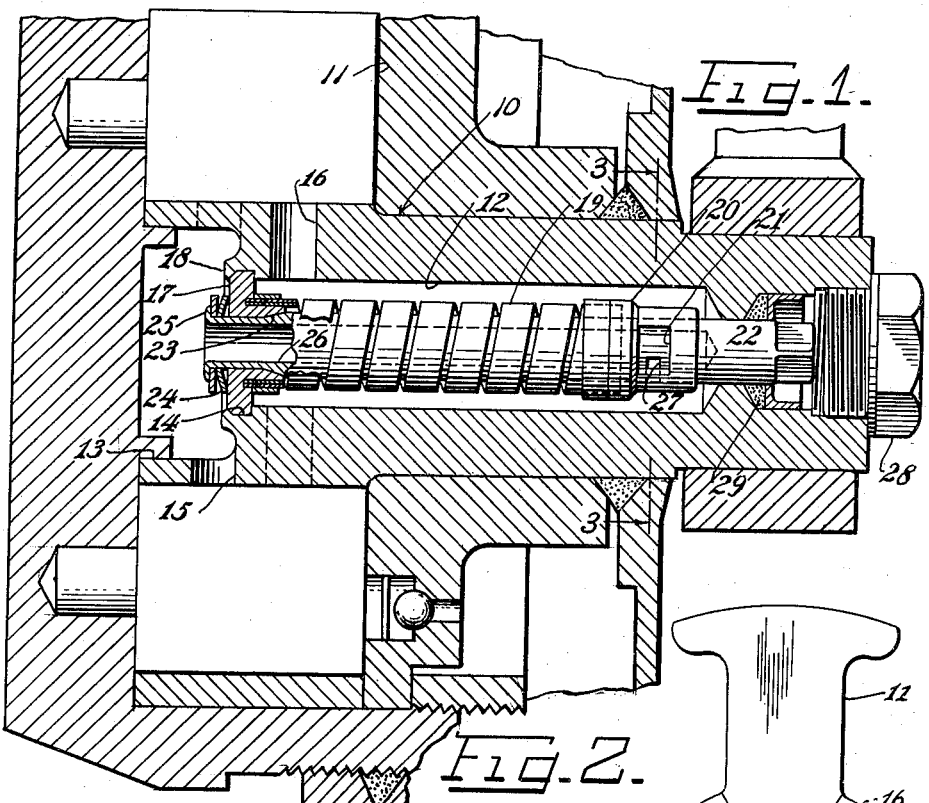
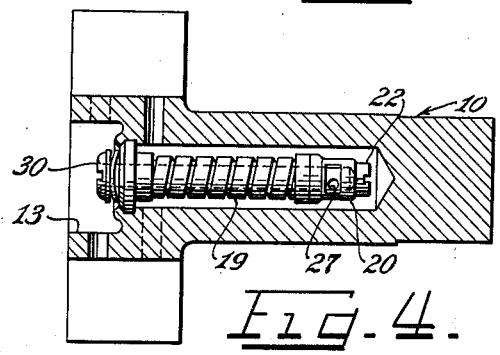
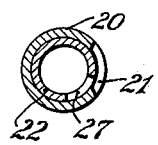
INVENTOR.
ADOLPH PETELER.
BY
ATTORNEY.

Patented Aug. 31, 1937

2,091,830

UNITED STATES PATENT OFFICE 2,091,830

SHOCK ABSORBER VALVE

Adolph Peteler, Freeport, N. Y.

Application June 9, 1936, Serial No. 84,287

7 Claims. (Cl. 188—100)

My invention relates to hydraulic shock absorbers, and more particularly to improvements in valve structure assemblies of the type described and illustrated in my copending application Serial No. 41,354, filed September 20, 1935 which has matured into Patent No. 2,063,621, issued Dec. 8, 1936.

An important object of the invention is to provide, in association with a hydraulic shock absorber having formed therein a fluid passage, a thermostatic valve assembly comprising a tubular member, the tubular member being extended lengthwise the passage and having formed therein a port around which a ported valve sleeve or member is adapted to turn; the position of the sleeve port with respect to the tube port being controlled by a helical bimetal thermostat. With this construction, the shock absorber fluid is caused to circulate over the thermostat, by which the thermostat is at all times directly responsive to fluid temperature. In the prior art structures, the thermostat is relatively isolated from the fluid which is actually flowing through the shock absorber, by which the responsiveness of the fluid is retarded.

A still further object of the invention is to so organize the valve assembly as to admit of manual pre-setting of the valve opening as an adjunct to the automatic adjustment of the opening obtaining from the bimetal thermostat.

Another object of the invention is to so construct the valve assembly as to free it from the need of very close manufacturing tolerances, and to render it free from all possibility of jamming due to bending or misalignment of its components.

Further objects of the invention will be apparent from a reading of the subjoined specification and claims, and from a consideration of the accompanying drawing, in which:

Fig. 1 is an axial section through the shaft and vane element of a hydraulic shock absorber, the shaft portion of which provides a housing for a thermostatically controlled valve;

Fig. 2 is an end elevation of the organization of Fig. 1;

Fig. 3 is a partial section on the line 3—3 of Fig. 1; and

Fig. 4 is an axial section, similar generally to that of Fig. 1, showing an alternative arrangement.

The shock absorber to which my invention is adapted to be applied is of the type disclosed in the copending application above referred to.

Briefly, it comprises a casing within which a shaft 10 is fitted and is journaled for rotation. The usual bearing lug and annular nut by means of which journaling of the shaft is effected, it is thought unnecessary to describe. Suffice it to say that the shaft 10 is adapted to carry at its outer end a lever by means of which it is fastened to a vehicle; the shaft being provided at its inner end with vanes 11 which extend out from the inner part of the shaft. The vanes, be it understood, are organized to displace the hydraulic fluid contained in the fluid chambers of the shock absorber body.

The vane-carrying shaft of the shock absorber is designated in its entirety by the numeral 10. Said shaft 10 is provided with an enlarged bore or fluid passage 12, the vane end of the shaft 10 being provided with a large recess 13 and an intermediate recess 14, the purpose of which will be presently described. Ports 15 and 16, respectively, permit communication between the recess 13 and the bore 12, and the exterior of the shaft 10. In fitting engagement with the recess 14 is a disc or collar 17, firmly attached within said recess by peening over the metal of the shaft as at 18. The collar 17 provides an anchorage for one end of a helically wound bimetal thermostatic strip 19 extending into the bore 12, this strip 19 having at its inner end a sleeve or valve member 20 provided with an axially elongated port 21. Concentric with the assembly is a tube or member 22 engaged at its inner end with the collar 17 for turning with respect thereto, the tube having a beveled portion 23 adapted to prevent displacement thereof to the left; the tube being prevented from right hand axial displacement by means of a spring washer 24 retained by peening the end of the tube as at 25. The bore 26 of the tube terminates short of the right hand end thereof as indicated. A port 27 is formed in the tube wall, to register with the port 21.

In the embodiment shown in Fig. 1, the tube 22 is extended through the right hand end of the shaft 10, and is squared at its extended end to provide a suitable terminal for turning the tube for manually adjusting the shock absorber. A screw closure 28 is provided to seal the shaft against fluid leakage, and a packing 29 may be provided between the tube 22 and the shaft 10.

In the embodiment shown in Fig. 4, the tube 22 is blind at its right hand end by virtue of an integral closure formed by the shaft 10, whereas the inner end 30 of the tube is provided with a screw slot whereby the tube 22 may only be adjusted when the shock absorber is disassembled, whereupon the recess 13 is open to view.

In the operation of the device, fluid passes through the port 16, the bore 12, through the ports 27 and 21, through the bore 26, and thence through the port 15, or reversely. Thereby, that fluid which is in motion always passes over the coils of the thermostatic element 19 by which the net opening between the ports 21 and 27 is always responsive to fluid temperature. In older forms of automatic temperature controls of the character herein described, the valve organization is conventionally placed at the inner end of the thermostatic coil, whereby the fluid acted upon by the shock absorber is isolated from the thermostatic coils. Also, in older forms of the invention, that member which is functionally equivalent to the sleeve 20 is borne exteriorly by the shaft and interiorly by the tube so that its freedom to turn is limited by its frictional engagement with other elements of the assembly. The present invention also eliminates binding of the valve due to bending, misalignment, or inaccurate machining of parts, which occurs in older forms of valve organizations. In the present invention, the sleeve 20 bears only upon the tube 22 and thus is at all times free to turn in response to the action of the thermostat element 19. Further difficulties are encountered with prior structures with respect to excessive friction induced by the arrangement of the parts which limited the free and correct functioning of the thermostatic valve. Since the fluid pressure in the shock absorber at times becomes quite high, it is desirable to eliminate from the thermostatic valve mechanism any influence which these pressures may have upon its action, and it is an important objective of this invention to attain this freedom of action which in itself constitutes a distinct improvement over the structures of the prior art.

In both of the alternative structures shown, the tube 22 provides a central adjustable element for the calibration of the valve. Due to the relative unfamiliarity of service personnel with correct adjustment of shock absorbers of this character, it is desirable to eliminate the possibility of inadvertent maladjustment by having any adjusting means wholly within the shock absorber unit. It is for this reason that the embodiment of Fig. 4 is shown. Alternatively, where service personnel, in specialized types of equipment, are familiar with proper adjustment, the shock absorber adjustment may be made without disassembling the shock absorber unit by the means provided in the embodiment of Fig. 1.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A unitary valve assembly for hydraulic shock absorbers including a tubular member through which the shock absorber fluid is adapted to pass, said tubular member having formed therein a port; a cooperating member turnable with respect to said tubular member, said cooperating member having formed therein a port adapted for variable overlap with the port in said tubular member; and a thermostat spiraled lengthwise about said tubular member and over which the shock absorber fluid is adapted to pass, said thermostat being fastened at one end to one of said members and at its opposite end to the structure of the shock absorber to turn the former accordingly as the thermostat is caused to expand and contract in response to changes in the temperature of the shock absorber fluid.

2. A unitary valve assembly for hydraulic shock absorbers including a tubular member through which the shock absorber fluid is adapted to pass, said tubular member being manually turnable within the structure of the shock absorber and having formed therein a port; means effective by induced friction to hold said tubular member against accidental turning; a cooperating member turnable with respect to said tubular member, said cooperating member having formed therein a port adapted for variable overlap with the port in said tubular member; and a thermostat spiraled lengthwise about said tubular member and over which the shock absorber fluid is adapted to pass, said thermostat being fastened at one end to said cooperating member and at its opposite end to the structure of the shock absorber to turn the former accordingly as the thermostat is caused to expand and contract in response to changes in the temperature of the shock absorber fluid.

3. In a hydraulic shock absorber having formed therein a bore, said bore being open at one end only to a communicating fluid passage; a valve including a ported sleeve rotatable to control the flow of fluid through said bore, said sleeve being disposed within said bore at a point remote from said passage and said valve comprising a part effective to direct the fluid in its passage through said bore from said fluid passage to said sleeve and vice versa; and means within said bore and bathed by the fluid therein to automatically adjust said ported sleeve accordingly as changes occur in the temperature of the fluid.

4. In a hydraulic shock absorber having formed therein a fluid passage; a tube extending lengthwise said passage and having formed therein a port; a sleeve turnable relatively to said tube and having formed therein a port adapted for variable overlap with said tube port to control the flow of fluid through said passage; a member fixed within said passage through which said tube extends and with respect to which the tube is turnable manually; and a bimetal thermostat in said passage operable automatically in response to changes in temperature of the fluid to turn said sleeve, said thermostat being spiraled about said tube and fastened at its opposite ends to said sleeve and to said member respectively.

5. In a hydraulic shock absorber having formed therein a fluid passage; a tube extending lengthwise said passage and having formed therein a port; a sleeve turnable relatively to said tube and having formed therein a port adapted for variable overlap with said tube port to control the flow of fluid through said passage; a member fixed within said passage through which said tube extends and with respect to which the tube is turnable manually; means effective to resist manual adjustment of said tube by induced frictional contact between said tube and member; and a thermostat within said passage operable automatically in response to changes in temperature of the fluid to turn said sleeve, said thermostat being spiraled about said tube and fastened at its opposite ends to said sleeve and to said member respectively.

6. In a hydraulic shock absorber having formed therein a fluid passage; a tube extending lengthwise said passage and having formed therein a port; a member fixed within said passage adjacent to one end thereof through which said tube extends and with respect to which the tube is turnable; a sleeve rotatable relatively to said tube and having formed therein a port adapted for variable overlap with said tube port to control the flow of fluid through said passage, said sleeve being disposed within said passage at a point adjacent to the opposite end thereof from said member, and a bimetal thermostat within said passage fastened at its opposite ends to said member and to said sleeve respectively, said thermostat being operable automatically in response to changes in temperature of the fluid in said passage to turn said sleeve accordingly as temperature changes of the fluid occur.

7. In a hydraulic shock absorber having formed therein a bore, said bore being open at one end only to a communicating fluid passage, a ported composite valve structure within said bore for controlling the flow of fluid therethrough, the port of said valve structure being disposed at a point remote from said fluid passage, and means within said bore bathed by the fluid in its passage therethrough and responsive in its action to changes in the temperature of the fluid to vary the effective area of said port by relatively moving a part of said composite valve structure.

ADOLPH PETELER.